(12) United States Patent
Fukamoto et al.

(10) Patent No.: US 9,340,181 B2
(45) Date of Patent: May 17, 2016

(54) BELT MEMBER AND SEATBELT APPARATUS INCLUDING THE BELT MEMBER

(71) Applicants: TOYOTA BOSHOKU KABUSHIKI KAISHA, Aichi-ken (JP); YKK Corporation, Tokyo (JP)

(72) Inventors: Masahiro Fukamoto, Miyoshi (JP); Atsuki Ito, Kasugai (JP); Nobuhiro Yamada, Kakamigahara (JP); Makoto Yamazaki, Kurobe (JP); Yasuhiko Matsuda, Kurobe (JP); Seiji Koga, Tokyo-to (JP)

(73) Assignees: TOYOTA BOSHOKU KABUSHIKI KAISHA, Aichi-Ken (JP); YKK CORPORATION, Tokyo (JP)

( * ) Notice: Subject to any disclaimer, the term of this patent is extended or adjusted under 35 U.S.C. 154(b) by 0 days.

(21) Appl. No.: 14/625,185

(22) Filed: Feb. 18, 2015

(65) Prior Publication Data

US 2015/0239427 A1 Aug. 27, 2015

(30) Foreign Application Priority Data

Feb. 21, 2014 (JP) ................................. 2014-031700

(51) Int. Cl.
| | |
|---|---|
| *B60R 22/12* | (2006.01) |
| *B60R 22/30* | (2006.01) |
| *B60R 22/00* | (2006.01) |
| *A44B 19/00* | (2006.01) |
| *A45F 3/04* | (2006.01) |
| *B60R 22/14* | (2006.01) |

(52) U.S. Cl.
CPC ................. *B60R 22/30* (2013.01); *A44B 19/00* (2013.01); *A45F 3/04* (2013.01); *B60R 22/00* (2013.01); *B60R 22/12* (2013.01); *B60R 22/14* (2013.01)

(58) Field of Classification Search
CPC ....................................................... B60R 22/00
See application file for complete search history.

(56) References Cited

U.S. PATENT DOCUMENTS

| | | | | |
|---|---|---|---|---|
| 3,306,662 A * | 2/1967 | Finnigan | ......................... | 297/482 |
| 3,957,282 A * | 5/1976 | Finnigan | ......................... | 297/482 |
| 4,057,181 A * | 11/1977 | Finnigan | ......................... | 224/280 |
| 4,678,205 A * | 7/1987 | Wold | ............................ | 280/808 |
| 4,699,401 A * | 10/1987 | Saenz | ............................ | 280/808 |
| 5,732,975 A * | 3/1998 | Gallegos | ........................ | 280/808 |
| 6,322,150 B1 * | 11/2001 | Harper et al. | ................. | 297/482 |
| 6,543,794 B1 * | 4/2003 | Tyree | ........................ | 280/33.992 |
| 6,557,895 B2 * | 5/2003 | Haack et al. | ................. | 280/801.1 |
| 7,752,925 B2 * | 7/2010 | Koors et al. | .............. | 73/862.391 |
| 8,465,055 B2 * | 6/2013 | Hill | .............................. | 280/801.1 |
| 8,733,789 B1 * | 5/2014 | Kinnear | ......................... | 280/733 |
| 2005/0121967 A1 * | 6/2005 | Crowl | ............................ | 297/482 |

FOREIGN PATENT DOCUMENTS

| | | | | |
|---|---|---|---|---|
| FR | 2530208 A1 * | 1/1984 | ............. | B60R 22/00 |
| JP | 2012-240432 | 12/2012 | | |

* cited by examiner

*Primary Examiner* — Nicole Verley
(74) *Attorney, Agent, or Firm* — Greenblum & Bernstein, P.L.C.

(57) ABSTRACT

A belt member includes: a strip member having an elongate shape; a fastener disposed along the longitudinal direction of the strip member; and an opening-closing device that opens or closes the fastener. For reducing a contact pressure of the belt member per unit area, the fastener is opened by the opening-closing device to unfold the belt member into a form of a wide strip so that the width of the belt member is increased. On the other hand, when the fastener is closed by the opening-closing device, the belt member takes a form of a narrow tube so that the width of the belt member is reduced.

8 Claims, 6 Drawing Sheets

BELT MEMBER AND SEATBELT APPARATUS INCLUDING THE BELT MEMBER

INCORPORATION BY REFERENCE

The disclosure of Japanese Patent Application No. 2014-031700 filed on Feb. 21, 2014 including the specification, drawings and abstract is incorporated herein by reference in its entirety.

BACKGROUND OF THE INVENTION

1. Field of the Invention

The invention relates to a belt member, and relates also to a seatbelt apparatus of a vehicle seat, the seatbelt apparatus including the belt member.

2. Description of Related Art

For example, Japanese Patent Application Publication No. 2012-240432 (JP 2012-240432 A) describes a seatbelt apparatus used to protect an occupant seated in a vehicle seat. This seatbelt apparatus includes a wider seatbelt to reduce a contact pressure of the seatbelt per unit area, thereby attenuating an impact that is applied from the seatbelt to an occupant. In the seatbelt apparatus described in JP 2012-240432 A, a guide member disposed at the rear of a shoulder of an occupant guides the seatbelt toward a retracting device. The guide face of the guide member, on which the seatbelt is guided, is formed such that curved guide portions, each having a C-shaped cross-section, are disposed so as to face each other. The curved guide portions are configured to curve and fold back the opposite end portions of the seatbelt in its width direction. The distance between the curved guide portions in the width direction is gradually reduced in a direction in which the seatbelt is retracted into an accommodating device.

In the seatbelt apparatus described in JP 2012-240432 A, when the seatbelt is retracted, the width of the seatbelt is reduced when the seatbelt is guided by the curved guide portions of the guide member, each having a C-shaped cross-section. Further, when the seatbelt is retracted, after the seatbelt passes through the guide member and is then pulled out of the guide member, the width of the seatbelt is increased due to the restoring force of the seatbelt itself. Thus, if the distance between the guide member and the accommodating device (retracting device) is set long, after the width of the seatbelt is once reduced by the guide member, the width of the seatbelt is expected to be increased due to the restoring force of the seatbelt itself, at a position between the guide member and the accommodating device. In this case, the seatbelt of which the width has been increased attempts to be retracted into the retracting device, causing a possibility that the seatbelt will fail to be smoothly retracted into the retracting device.

SUMMARY OF THE INVENTION

The invention provides a belt member configured such that the width of the belt member is reliably increased or reduced, and also provides a seatbelt apparatus including the belt member.

A first aspect of the invention relates to a belt member including: a strip member having an elongate shape; a fastener disposed along the longitudinal direction of the strip member; and an opening-closing device that opens or closes the fastener. For reducing a contact pressure of the belt member per unit area, the fastener is opened by the opening-closing device to unfold the belt member into a form of a wide strip so that the width of the belt member is increased. When the fastener is closed by the opening-closing device, the belt member takes a form of a narrow tube so that the width of the belt member is reduced.

According to the first aspect, when the fastener is opened or closed by the opening-closing device, the width of the belt member is reliably increased or reduced. When the fastener is opened, the belt member is unfolded into the form of a wide strip so that the width of the belt member is increased. Thus, it is possible to reduce the contact pressure of the belt member per unit area.

In the first aspect, each end portion of the belt member may be provided with a load bearing portion that bears a load acting on the belt member.

With the above configuration, the load acting on the belt member is borne by the load bearing portions provided at the respective end portions of the belt member.

A second aspect of the invention relates to a seatbelt apparatus including: the belt member according to the first aspect; a retracting device that retracts one end portion of the belt member such that the one end portion of the belt member is allowed to be pulled out of the retracting device; a seatbelt anchor to which the other end portion of the belt member is fixed; and an attachment member that is disposed on a path along which the belt member is pulled out of the retracting device, the attachment member being fitted with the opening-closing device that opens or closes the fastener of the belt member. The belt member pulled out through the attachment member is unfolded into a form of a wide strip so that the width of the belt member is increased, when the fastener is opened by the opening-closing device. The belt member retracted through the attachment member takes a form of a narrow tube so that the width of the belt member is reduced, when the fastener is closed by the opening-closing device.

According to the second aspect, in the case where the belt member is pulled out to be used, when the belt member is pulled out through the attachment member, the fastener is opened by the opening-closing device. The belt member pulled out through the attachment member is unfolded into the form of a wide strip due to its restoring force. Thus, an occupant seated in the vehicle seat is protected by the belt member unfolded into the form of a wide strip. That is, increasing the width of the belt member makes it possible to reduce a contact pressure per unit area, thereby attenuating an impact that is applied from the belt member to the occupant. In the case where the belt member is retracted to be accommodated in the retracting device, when the belt member is retracted through the attachment member, the fastener is closed by the opening-closing device, so that the belt member takes the form of a narrow tube. As a result, the belt member is smoothly retracted into the retracting device without difficulty.

In the seatbelt apparatus according to the second aspect, the attachment member may also serve as a belt guide member having a through-hole that guides the belt member when the belt member is pulled out of the retracting device or retracted into the retracting device in a state where the belt member is passed through the through-hole, and the opening-closing device may be attached to the attachment member so as to face the through-hole.

With the above configuration, it is possible to restrict an increase in the number of components because the attachment member also serves as the belt guide member.

In the seatbelt apparatus according to the second aspect, opposite end portions of the strip member, which constitutes the belt member, in a width direction of the strip member may be respectively provided with covering portions that cover the fastener.

With the above configuration, it is possible to protect the fastener and prevent deterioration of the appearance due to exposure of the fastener, by covering the fastener with the covering portions.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described with reference to the accompanying drawings.

Figure 1:
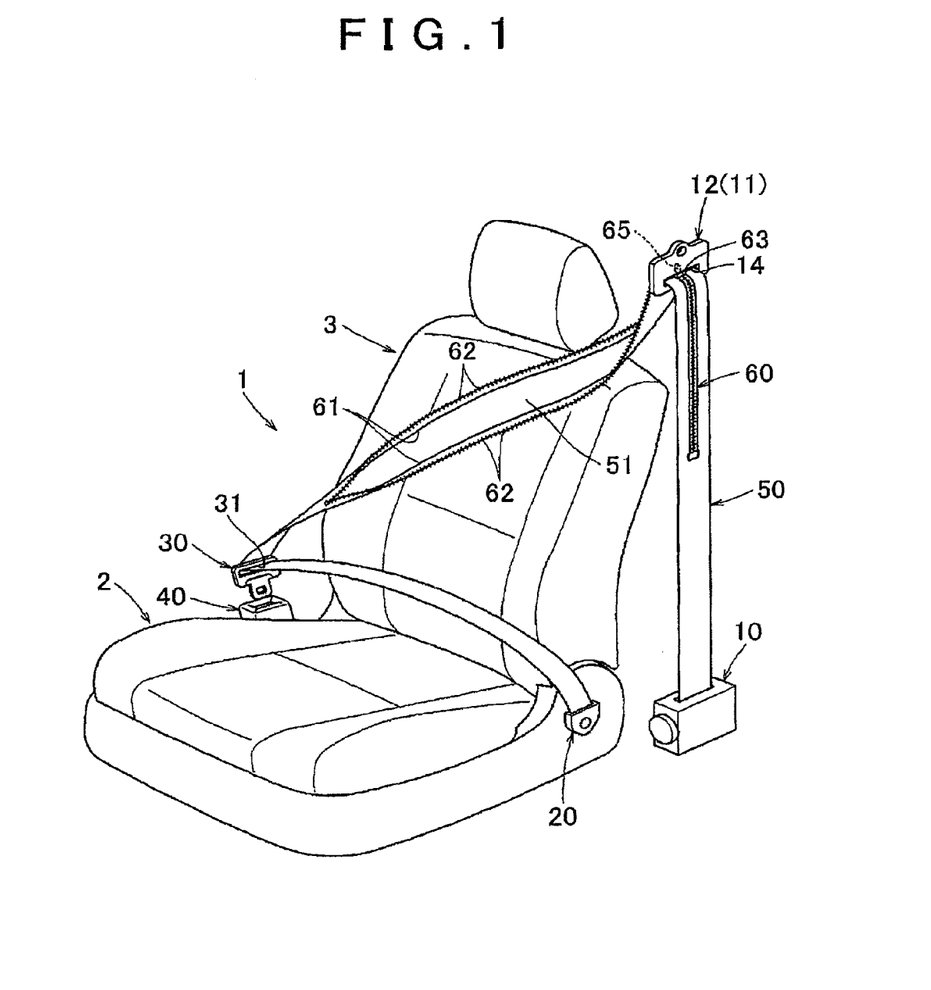
FIG. 1 is a perspective view schematically illustrating the arrangement of a vehicle seat and a seatbelt apparatus including a belt member according to a first embodiment of the invention.

A first embodiment of the invention will be described with reference to FIG. 1 to FIG. 6. In the first embodiment, a seatbelt apparatus including a belt member according to the invention will be described. FIG. 1 illustrates the seatbelt apparatus used to protect an occupant seated in a vehicle seat 1 including a seat cushion 2 and a seatback 3. As illustrated in FIG. 1, the seatbelt apparatus includes a retracting device 10, a belt guide member (referred also to as a through-anchor or a slip joint) 12, a seatbelt anchor 20, a seatbelt tongue plate 30, a buckle 40 and a belt member 50.

The retracting device 10 and the seatbelt anchor 20 (each of which may function as a load bearing portion in the invention) are disposed near a lower portion of a pillar of a vehicle body. The pillar is located at a position on the side of the vehicle seat 1 and outward of the vehicle seat 1 in the vehicle width direction. Note that the retracting device 10 may be disposed in the seatback 3 of the vehicle seat 1, and the seatbelt anchor 20 may be disposed at a position outward of a side frame portion of a cushion frame of the seat cushion 2 in the vehicle width direction. The belt guide member 12 is disposed near an upper portion of the pillar of the vehicle body. Note that the belt guide member 12 may be disposed near an upper face of a shoulder portion of the seatback 3. The buckle 40 is disposed at a position inward of the side frame portion of the cushion frame of the seat cushion 2.

As illustrated in FIG. 1, the belt member 50 is a pullout belt that is retracted at one end portion thereof into the retracting device 10. The belt member 50 is passed through a through-hole 14 of the belt guide member 12, and is fixed at the other end portion thereof to the seatbelt anchor 20. The seatbelt tongue plate 30 is movably fitted to the belt member 50 such that the belt member 50 passes through a through-hole 31 of the seatbelt tongue plate 30.

Figure 2:
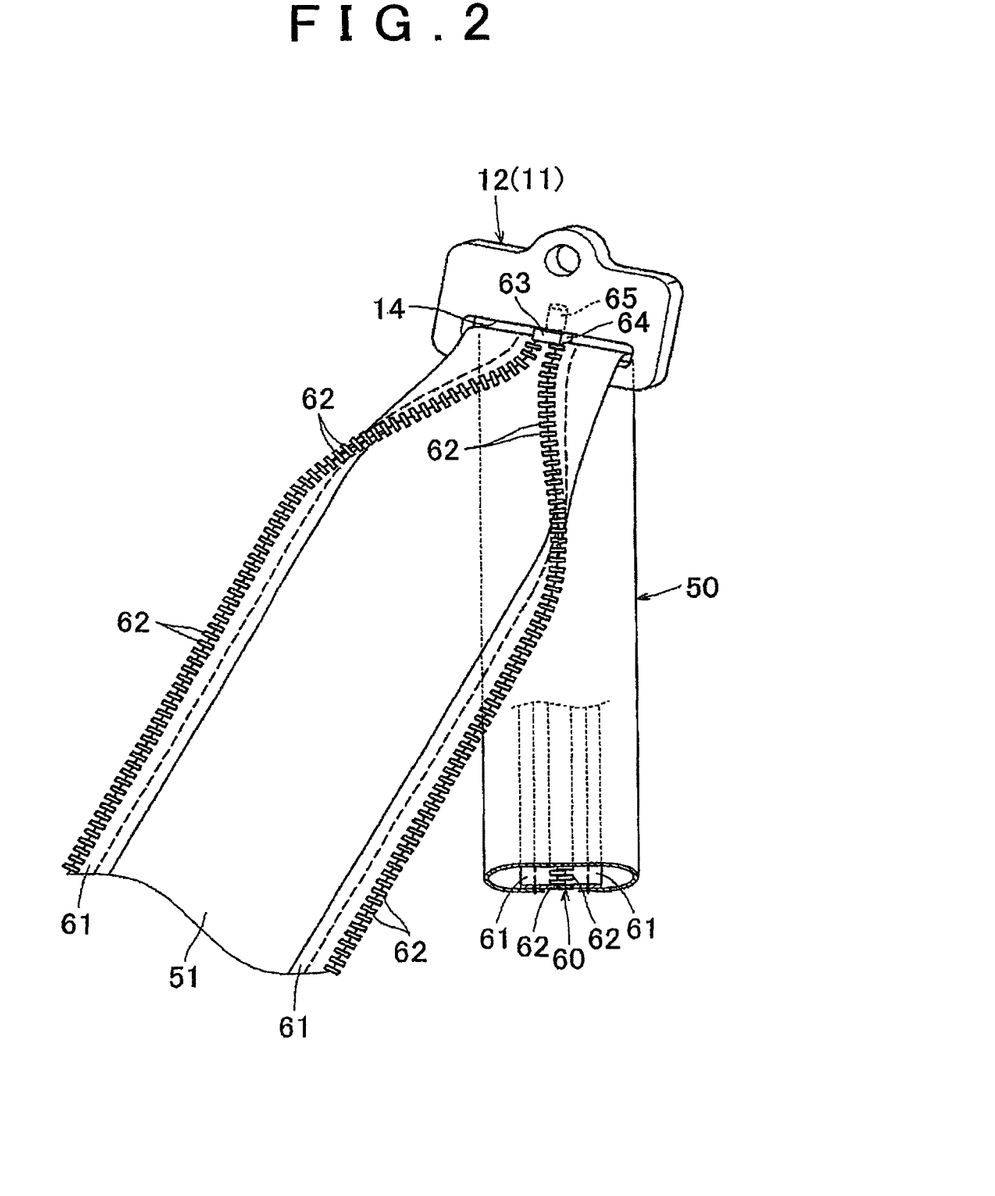
FIG. 2 is a perspective view illustrating the relationship between the belt member and an opening-closing device of an attachment member that also serves as a belt guide member.
Figure 3:
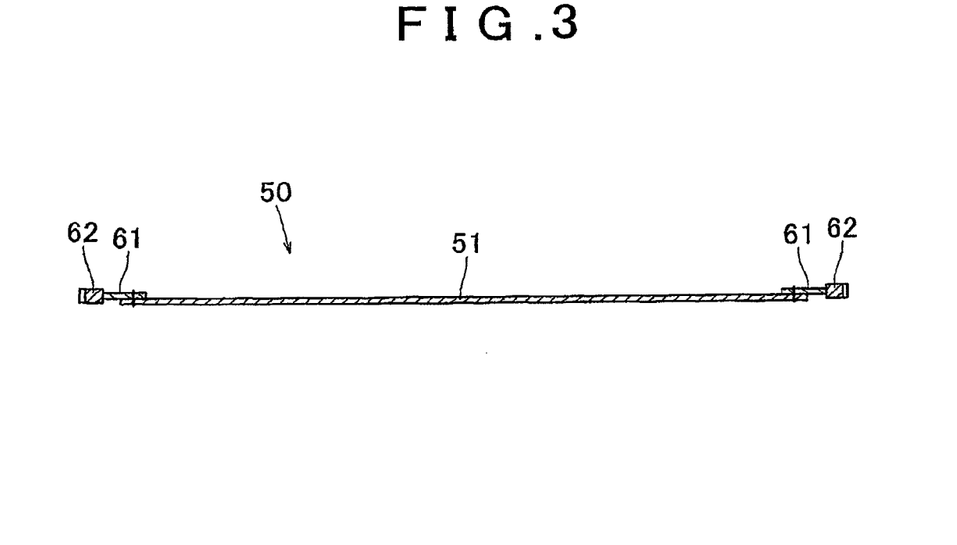
FIG. 3 is a cross-sectional view illustrating the state where a fastener is opened and the belt member is unfolded into the form of a wide strip.
Figure 4:
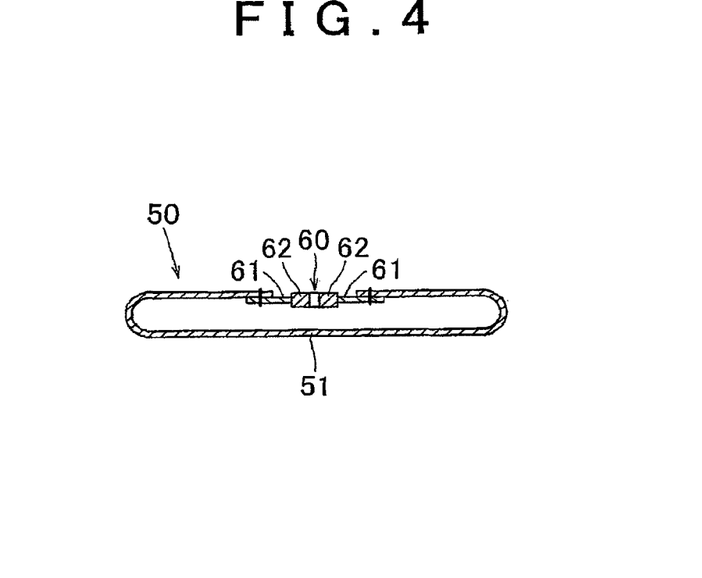
FIG. 4 is a cross-sectional view illustrating the state where the fastener is closed and the belt member takes the form of a narrow tube.

As illustrated in FIG. 2 to FIG. 4, the belt member 50 includes an elongate and wide strip member 51, and a fastener 60 disposed along the longitudinal direction of the opposite end portions of the wide strip member 51 in its width direction. In the first embodiment, the fastener 60 includes a pair of tapes 61, and the tapes 61 are sewn, by a sewing-machine or the like, to a portion of the belt member 50 which supports the chest and other nearby portions of an occupant in the usage state of the seatbelt apparatus. Further, at the other portion of the belt member 50, the opposite end portions of the wide strip member 51 are sewn together, by a sewing-machine or the like, into the form of a tube. The tapes 61 are provided respectively with elements 62 that are engaged with each other.

The belt member 50 is provided with a slider 63 that may function as an opening-closing device in the invention. The slider 63 closes the fastener 60 by engaging the elements 62 of the fastener 60 with each other or opens the fastener 60 by disengaging the elements 62 of the fastener 60 from each other. The attachment member 11 is disposed on a path along which the belt member 50 is pulled out of the retracting device 10. The slider 63, which may function as the opening-closing device in the invention, is attached to the attachment member 11. In the first embodiment 1, the attachment member 11 also serves as the belt guide member 12 having the through-hole 14. The through-hole 14 guides the belt member 50 when the belt member 50 is pulled out of the retracting device 10 or retracted into the retracting device 10 in the state where the belt member 50 is passed through the through-hole 14. The belt guide member 12 is pivotably (turnably) attached at its upper portion to the vicinity of the upper portion of the pillar of the vehicle body, which is a vehicle body-side member, with an attachment shaft such as a stepped bolt.

The slider 63, which may function as the opening-closing device in the invention, includes a slider body 64 and a pole portion 65 that projects from the upper face of the slider body 64. The pole portion 65 is attached to the attachment member 11 with the slider body 64 facing the through-hole 14. As illustrated in FIG. 2, the belt member 50 pulled out through the attachment member 11 is unfolded into the form of a wide strip (the belt member 50 pulled out through the attachment member 11 is unfolded, so that the width of the belt member 50 is increased) due to its restoring force because the fastener 60 is opened by the slider 63 (the elements 62 are disengaged from each other). The belt member 50 retracted through the attachment member 11 is folded into the form of a narrow tube because the fastener 60 is closed by the slider 63 (the elements 62 are engaged with each other).

The seatbelt apparatus including the belt member 50 according to the first embodiment is configured as described above. Thus, in the case where the belt member 50 is pulled out to be used, when the belt member 50 is pulled out through the attachment member 11, the fastener 60 is opened by the slider 63. As illustrated in FIG. 1 and FIG. 2, the belt member 50 pulled out through the attachment member 11 is unfolded into the form of a wide strip due to its restoring force. Thus, an occupant seated in the vehicle seat is protected by the belt member 50 unfolded into the form of a wide strip. That is, increasing the width of the belt member 50 makes it possible to reduce a contact pressure per unit area, thereby attenuating an impact that is applied from the belt member 50 to the occupant. At this time, a load that acts on the belt member 50 is borne by the retracting device 10 and the seatbelt anchor 20, each of which may function as the load bearing portion in the invention.

In the case where the belt member 50 is retracted to be accommodated in the retracting device 10, when the belt member 50 is retracted through the attachment member 11 as illustrated in FIG. 2 and FIG. 4, the fastener 60 is closed by the slider 63, so that the belt member 50 takes the form of a narrow tube. As a result, the belt member 50 is smoothly retracted into the retracting device 10 without difficulty. In addition, because the belt member 50 takes the form of a narrow tube when it is retracted into the retracting device 10, it is no longer necessary to increase the size of the retracting device 10 in accordance with the width of the wide strip member 51.

In the first embodiment, the attachment member 11 also serves as the belt guide member 12. Thus, it is possible to restrict an increase in the number of components.

Figure 7:
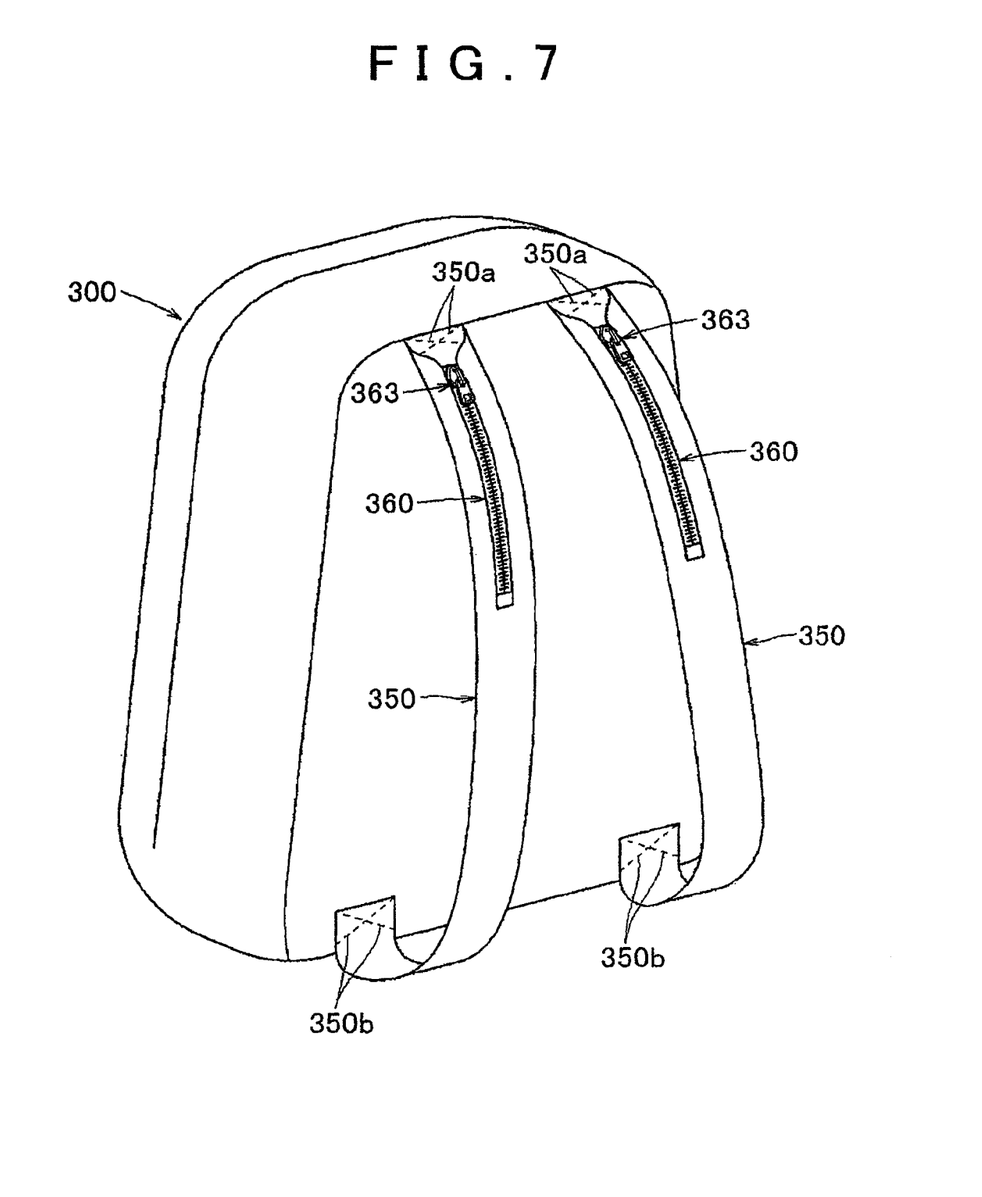
FIG. 7 is a schematic perspective view of a backpack including belt members according to a second embodiment of the invention, illustrating the state where a fastener of each belt member is closed, so that the width of the belt member is reduced.
Figure 8:
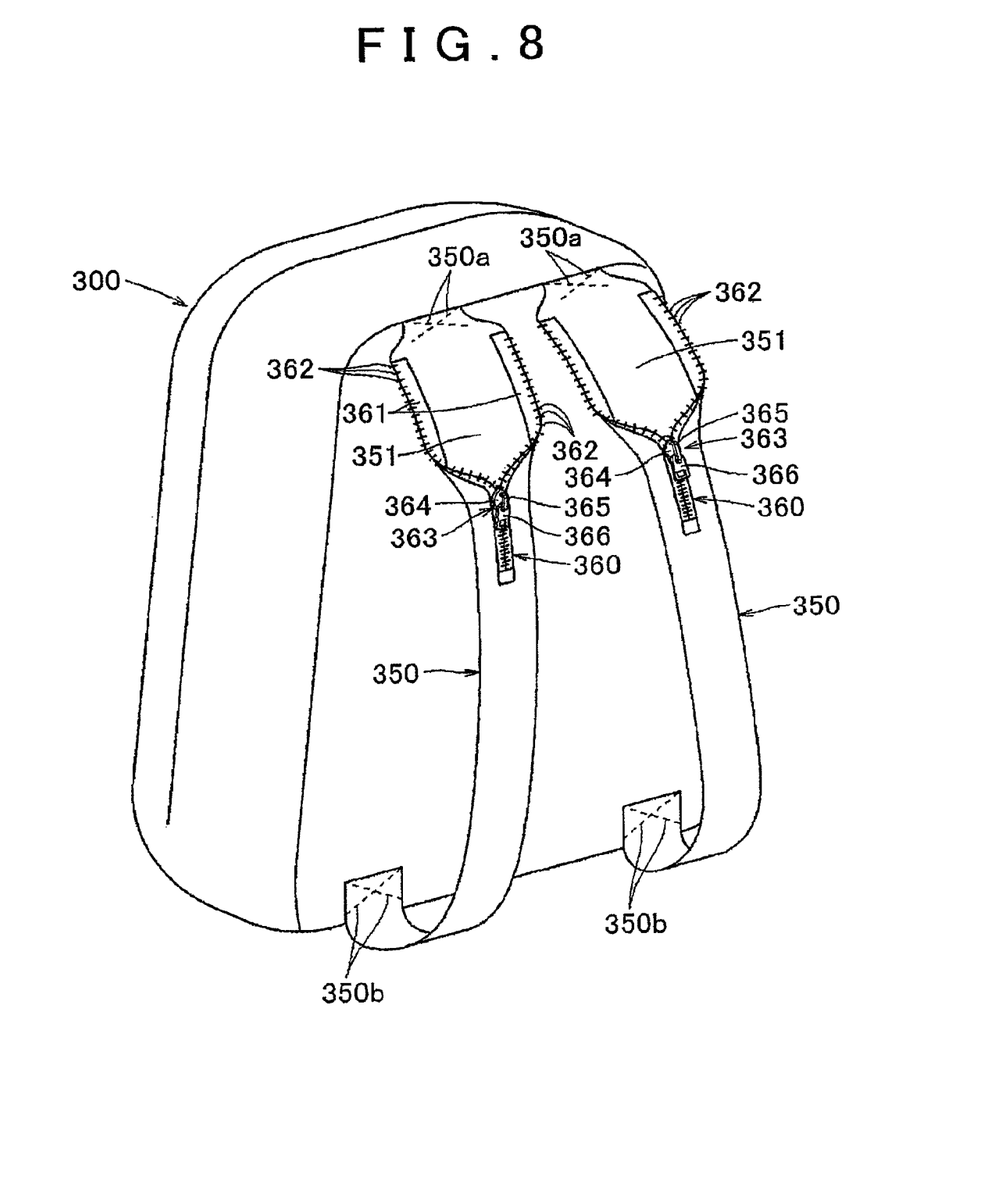
FIG. 8 is a schematic perspective view illustrating the state where the fastener of each belt member is opened, so that the width of the belt member is increased.

Next, a second embodiment of the invention will be described with reference to FIG. 7 and FIG. 8. In the second embodiment, a backpack including belt members according to the invention will be described. As illustrated in FIG. 7 and FIG. 8, the backpack includes a bag 300 that accommodates articles, and a pair of right and left belt members 350 with which the bag 300 is carried on the back of a user.

Each of the belt members 350 includes a strip member 351 and a fastener 360 disposed along the longitudinal direction of the opposite end portions of the strip member 351 in its width direction. The upper end portion and the lower end portion of each belt member 350 are respectively fixed to an upper portion and a lower portion of the bag 300, at sewn portions 350a, 350b (each of which may function as a load bearing portion in the invention) formed by a sewing-machine or the like. In the second embodiment, a pair of tapes 361 of the fastener 360 is sewn, by a sewing-machine or the like, to a portion of the belt member 350, which is brought into contact with a shoulder of a user when the backpack is carried on the back of the user. The tapes 361 are provided respectively with elements 362 that are engaged with each other.

The fastener 360 of each of the belt members 350 is provided with a slider 363 that may function as an opening-closing device in the invention. The slider 363 closes the fastener 360 by engaging the elements 362 of the fastener 360 with each other, or opens the fastener 360 by disengaging the elements 362 of the fastener 360 from each other. In the second embodiment, the slider 363 includes a slider body 364, a pole portion 365 that projects from the upper face of the slider body 364, and a pull-tab 366 that is connected to the pole portion 365 and used to slide the slider 363. As the slider 363 is slid, the fastener 360 is opened (the elements 362 are disengaged from each other) and thus the belt member 350 is unfolded into the form of a wide strip due to its restoring force (the belt member 350 is unfolded, so that the width of the belt member 350 is increased). When the fastener 360 is closed (the elements 362 are engaged with each other) by the slider 363, the belt member 350 takes the form of a narrow tube.

In the backpack including the thus configured belt members 350 according to the second embodiment, when a user holds the pull-tub 366 and slides the slider 363, which may function as the opening-closing device in the invention, to open or close the fastener 360, the width of each of the belt members 350 is reliably increased or reduced. When the backpack is carried on the user's back, if the weight of the articles accommodated in the bag 300 is light, the backpack is used with the fasteners 360 closed as illustrated in FIG. 7. At this time, because each of the belt members 350 is narrow, the user can carry the backpack on his/her back without feeling uncomfortable.

When the backpack is carried on the user's back, the sewn portions 350a, 350b function as the load bearing portions that bear loads that act on the belt members 350. On the other hand, when the weight of the articles accommodated in the bag 300 is heavy, the backpack is used with the fasteners 360 opened as illustrated in FIG. 8. At this time, the portion of each belt member 350, which is brought into contact with a shoulder of the user, is unfolded into the form of a wide strip. Thus, a contact pressure of the belt member 350 per unit area, which is applied from the belt member 350 to the user, is reduced. As a result, it is possible to disperse the load that acts on the shoulder of the user within a wide range.

Figure 5:
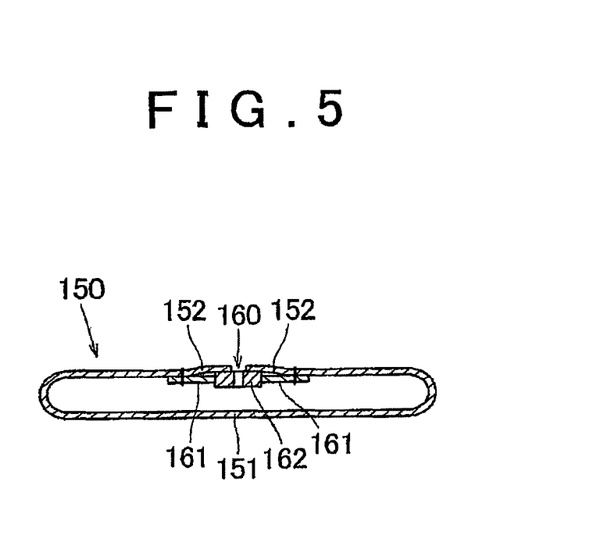
FIG. 5 is a cross-sectional view illustrating an embodiment in which the fastener is covered with covering portions that are parts of a wide strip member which constitutes the belt member, the covering portions being formed by extending the opposite end portions of the strip member in its width direction.
Figure 6:
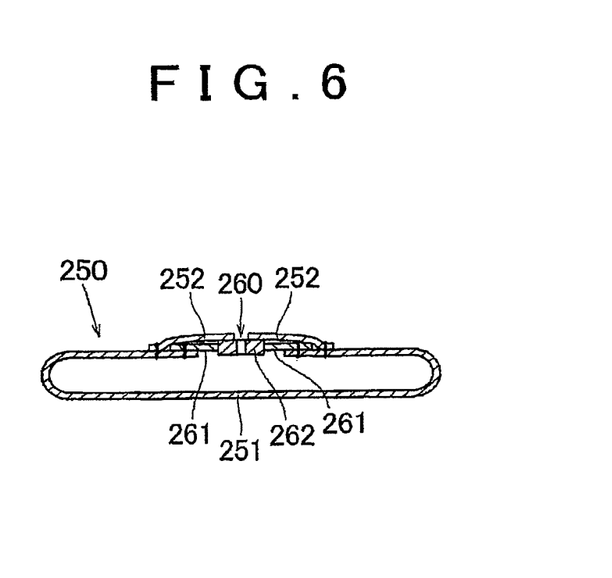
FIG. 6 is a cross-sectional view illustrating an embodiment in which the fastener is covered with covering tapes that are prepared independently of the wide strip member which constitutes the belt member.

The invention is not limited to the first and second embodiments described above. The invention may be implemented in various other embodiments within the scope of the invention. For example, as illustrated in FIG. 5, the opposite end portions of the strip member 151 that constitutes the belt member 150 are extended and the extended portions may be used as covering portions 152 that cover the tapes 161 and the elements 162 of the fastener 160. In this case, covering the tapes 161 and the elements 162 of the fastener 160 with the covering portions 152 makes it possible to protect the fastener 160 and prevent deterioration of the appearance due to exposure of the fastener 160. Alternatively, as illustrated in FIG. 6, covering portions 252, each of which is in the form of a tape and which cover the tapes 261 and the elements 262 of the fastener 260, may be sewn respectively, by a sewing-machine or the like, to the opposite end portions of the strip member 251 in its width direction, the strip member 251 constituting the belt member 250. In this case as well, covering the tapes 261 and the elements 262 of the fastener 260 with the covering portions 252 makes it possible to protect the fastener 260 and prevent deterioration of appearance due to exposure of the fastener 260.

In the first embodiment, the seatbelt apparatus including the belt member according to the invention is described. In the second embodiment, the backpack including the belt members according to the invention is described. However, the belt member according to the invention may be applied to articles other than the seatbelt apparatus and the backpack.

What is claimed is:
1. A belt member comprising:
a strip member having an elongate shape;
a fastener disposed along a longitudinal direction of the strip member; and
an opening-closing device that opens or closes the fastener, wherein
for reducing a contact pressure of the belt member per unit area, the fastener is opened by the opening-closing device to unfold the belt member into a form of a wide strip so that a width of the belt member is increased, the fastener extending less than an entire length of the strip member in the longitudinal direction of the strip member such that only a portion of the belt member is configured to unfold into the wide strip form, and when the fastener is closed by the opening-closing device, the belt member takes a form of a narrow tube so that the width of the belt member is reduced, wherein the opening-closing device is separate from the strip member and engages the fastener to open and close the fastener.

2. The belt member according to claim 1, wherein each end portion of the belt member is provided with a load bearing portion that bears a load acting on the belt member.

3. A seatbelt apparatus for a vehicle seat, the seatbelt apparatus comprising:

the belt member according to claim 1;

a retracting device that retracts one end portion of the belt member such that the one end portion of the belt member is allowed to be pulled out of the retracting device;

a seatbelt anchor to which the other end portion of the belt member is fixed; and an attachment member that is disposed on a path along which the belt member is pulled out of the retracting device, the attachment member being fitted with the opening-closing device that opens or closes the fastener of the belt member, wherein the belt member pulled out through the attachment member is unfolded into a form of a wide strip so that the width of the belt member is increased, when the fastener is opened by the opening-closing device, and the belt member retracted through the attachment member takes a form of a narrow tube so that the width of the belt member is reduced, when the fastener is closed by the opening-closing device.

4. The seatbelt apparatus according to claim 3, wherein:

the attachment member also serves as a belt guide member having a through-hole that guides the belt member when the belt member is pulled out of the retracting device or retracted into the retracting device in a state where the belt member is passed through the through-hole; and the opening-closing device is attached to the attachment member so as to face the though-hole.

5. The seatbelt apparatus according to claim 3, wherein opposite end portions of the strip member, which constitutes the belt member, in a width direction of the strip member are respectively provided with covering portions that cover the fastener.

6. A seatbelt apparatus for a vehicle seat, the seatbelt apparatus comprising:

the belt member according to claim 1; and an attachment member having an aperture that receives the strip member, wherein the opening-closing device is provided on the attachment member.

7. The seatbelt apparatus according to claim 6, wherein the strip member is devoid of an internal passage configured to allow complete passage therethrough of a separate elongated member.

8. The belt member according to claim 1, wherein the strip member is devoid of an internal passage configured to allow complete passage therethrough of a separate elongated member.

\* \* \* \* \*